United States Patent [19]

Miya et al.

[11] Patent Number: 5,100,849
[45] Date of Patent: Mar. 31, 1992

[54] PROCESS FOR PRODUCING A CATALYST FOR OLEFIN POLYMERIZATION

[75] Inventors: Shinya Miya; Masami Tachibana; Yuuji Karasawa, all of Ichiharashi, Japan

[73] Assignee: Chisso Corporation, Osaka, Japan

[21] Appl. No.: 573,787

[22] Filed: Aug. 28, 1990

[30] Foreign Application Priority Data

Oct. 2, 1989 [JP] Japan .................................. 1-257327

[51] Int. Cl.$^5$ ................................................ C08F 4/64
[52] U.S. Cl. ................................................ 502/9; 502/8; 502/111; 502/125; 502/126; 502/127; 502/121; 502/123
[58] Field of Search .................... 502/8, 9, 111, 125, 502/126, 127, 121, 123

[56] References Cited

U.S. PATENT DOCUMENTS 4,481,342  11/1984  Invernizzi et al. .................. 502/125
4,829,034  5/1989  Iiskolan et al. ...................... 502/125

OTHER PUBLICATIONS

Shell Internationale Research, Chem. Ab. 107, (1987), 176662j.

Primary Examiner—Patrick P. Garvin
Assistant Examiner—Brent M. Peebles
Attorney, Agent, or Firm—Fred Philpitt

[57] ABSTRACT

A process for producing a catalyst component for olefin polymerization is provided, which process comprises spraying a solution of a magnesium compound e.g. $MgCl_2$ and an alcohol such as $MgCl_2 \cdot nROH$ (wherein R is 1-10 C alkyl and n is 3-6) into a cooled spray column to obtain a spherical solid component (carrier) without any substantial vaporization of the alcohol, followed by partly drying the component for a time till a specified ratio of the alcohol/$MgCl_2$ is attained, and then subjecting the resulting component to treatment with a titanium halide and an electron-donating component, the resulting component having a large particle diameter, without any dispersion of the solvent content in the component particles and also without any breakage of the particles when subjected to treatment with the titanium halides.

5 Claims, 1 Drawing Sheet

PROCESS FOR PRODUCING A CATALYST FOR OLEFIN POLYMERIZATION

BACKGROUND OF THE INVENTION

1. Field of the Invention

This invention relates to a process for producing a solid catalyst component for olefin polymerization. More particularly it relates to a process for producing a spherical solid catalyst component for olefin polymerization, having a large particle diameter.

2. Description of the Related Art

As catalysts for olefin polymerization, Ziegler Natta catalysts have generally been used. As one of the catalysts, a supported type catalyst using a magnesium compound as a carrier is known, and a number of patent literatures directed to those exhibiting a superior polymerization activity have been reported. It is preferred for such a supported type catalyst to control the shape of the catalyst particles, and some processes therefor have been known, but they are insufficient as a process for obtaining a solid catalyst component having a large particle diameter and a spherical shape.

As one of such processes, there is disclosed a melt-quenching process of emulsifying the melt of the carrier component in a suitable oil to form spherical molten particles, followed by adding the particles into a cooled hydrocarbon medium to rapidly solidifying them (Japanese patent application laid-open Nos. Sho 55-135,102, Sho 55-135,103 and Sho 56-67,311). However, such a process raised problems that when the carrier particles are prepared, it is necessary to use a surfactant or the like, or voids are present inside the particles or sufficiently large particles cannot be obtained, etc.

Further, as a separate process, spray-drying process and spray-cooling process are known. According to spray-drying process (Japanese patent application laid-open Nos. Sho 49-65,999, Sho 52-38,590, Sho 58-45,206, Sho 57-198,709, Sho 59-131,606 and Sho 63-289,005), a solution of a magnesium compound in water or an alcohol is sprayed into heated nitrogen gas current to allow water or the alcohol to vaporize from the resulting droplets by the heated nitrogen gas and thereby obtain spherical solid carrier particles. However, this process raised a problem that since the solvent continuously and rapidly vaporizes from the particles, the resulting particles are porous, indefinite in the solvent content and unhomogeneous.

Further, according to the spray-cooling process (Japanese patent application laid-open No. Sho 63-503,550), a magnesium compound of the formula $MgCl_2 \cdot xLOH \cdot ySKY$ in molten state is sprayed into a chamber cooled by a cooling inert fluid to obtain spherical solid carrier particles without vaporization of solvent. However, the process has drawbacks that the shape of the carrier particles obtained according to this process is often insufficient and the particles are broken when subjected to treatment with titanium halides.

SUMMARY OF THE INVENTION

The present inventors have made extensive research in order to solve the above-mentioned problems, and as a result, have found that when an alcohol solution of a magnesium compound such as $MgCl_2$ is sprayed into a cooled spray column to obtain a spherical carrier without vaporization of the alcohol, followed by drying the carrier for a time till a specified ratio of the alcohol/$MgCl_2$ is attained, then there is obtained a spherical solid catalyst component having a large particle diameter, without any dispersion of the solvent content in the particles, and also without any breakage of the particles when subjected to treatment with titanium halides, and have achieved the present invention based upon the above finding.

The present invention has the following constitutions (1) to (6):

(1) A process for producing a catalyst component for olefin polymerization, which process comprises spraying a solution of a magnesium compound and an alcohol without any substantial vaporization of said alcohol to obtain a spherical solid component, followed by partly drying said solid component by vaporizing said alcohol therein and then treating the dried solid component with a titanium halide and an electron-donating compound.

(2) A production process according to item (1), wherein said solution of a magnesium compound and an alcohol has a composition of the formula expressed by the formula $MgCl_2 \cdot nROH$ wherein R represents an alkyl group of 1 to 10 carbon atoms and n represents 3.0 to 6.0.

(3) A production process according to item (1), wherein the inside of a spraying column is cooled at the time of the spraying to thereby obtain a spherical solid component having the same composition as that of said solution recited in item (2), without any substantial vaporization of said alcohol.

(4) A production process according to item (1), wherein the solid component after partly dried has a composition expressed by the formula, $MgCl_2 \cdot mROH$ wherein R represents an alkyl group of 1 to 10 carbon atoms and m represents 0.4 to 2.0.

(5) A production process according to item (1), wherein said dried solid component is reacted with said titanium halide in a molar ratio of Ti in said titanium halide to $MgCl_2$ in said catalyst component of 1 to 100, at $-20°$ C. to $+200°$ C. and for 5 minutes to 6 hours.

(6) A production process according to item (1), wherein said dried solid component is reacted with said electron-donating compound in a molar ratio of said compound to $MgCl_2$ of 0.01 to 0.8, at $-20°$ C. to $+200°$ C. and for 5 minutes to 6 hours.

Namely, a representative constitution of the present invention is a process for producing a catalyst component for olefin polymerization, which process comprises spraying a solution of a magnesium compound and an alcohol, expressed by the formula $MgCl_2 \cdot nROH$ wherein R represents an alkyl group of 1 to 10 carbon atoms and n represents 3.0 to 6.0, into a spray column, while cooling the inside of the spray column to obtain a spherical solid component having the same composition as the above composition without any substantial vaporization of the alcohol, partly drying the solid component till the composition reaches a composition expressed by the formula $MgCl_2 \cdot mROH$ wherein R represents an alkyl group of 1 to 10 carbon atoms and m represents 0.4 to 2.0 and then treating the resulting dried solid component with a titanium halide and an electron-donating compound.

DETAILED DESCRIPTION OF PREFERRED EMBODIMENTS

Figure 1:
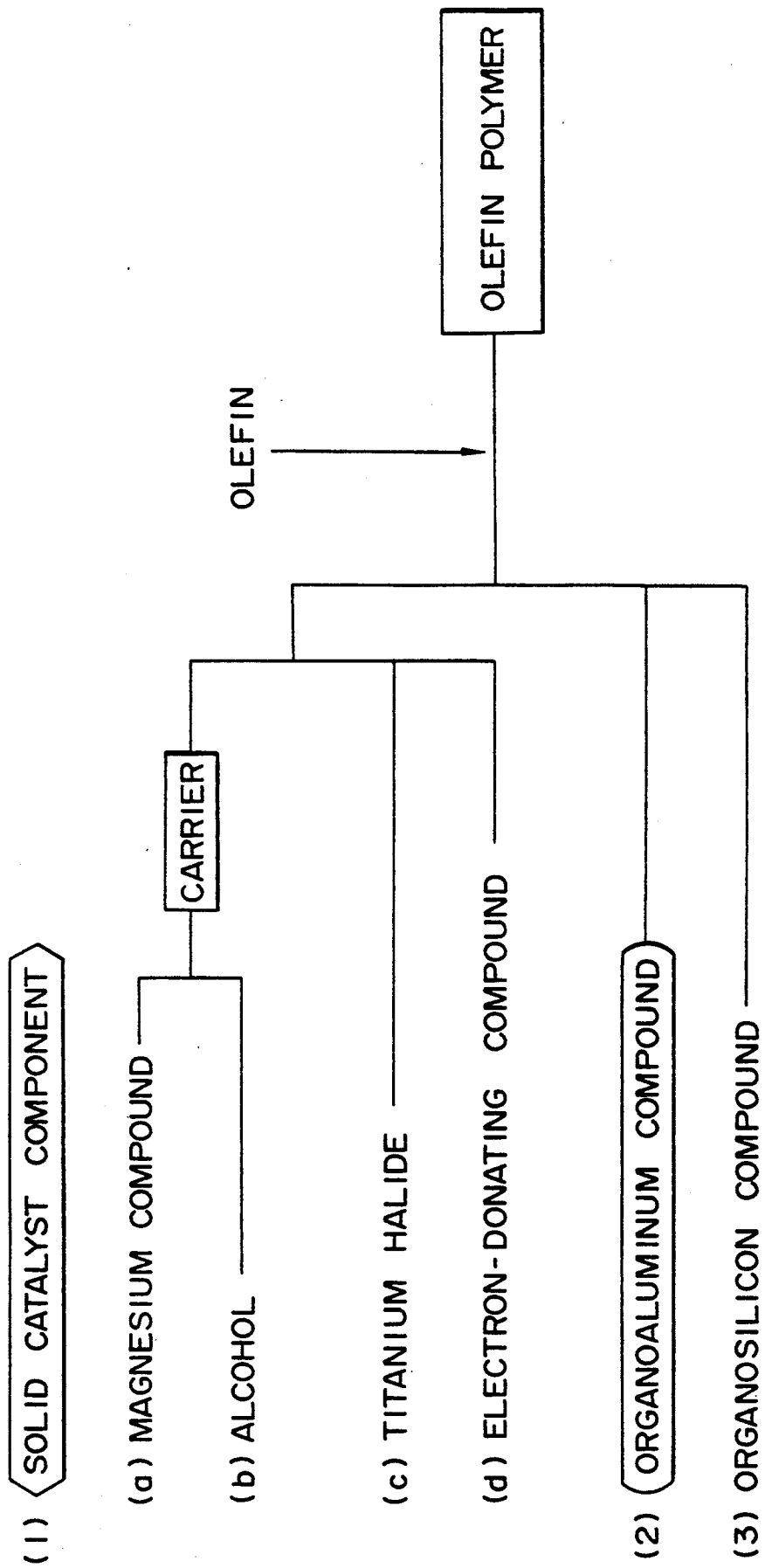
FIG. 1 shows a flow sheet of production of olefin polymers using a catalyst for the process of the present invention.

The magnesium compound used in the present invention is preferably anhydrous $MgCl_2$ which may contain a trace of water to an extent contained in commercially available product. As the solvent used, alcohols (preferably expressed by the formula ROH) are effective and R represents an alkyl group of 1 to 10 carbon atoms. Concrete examples thereof are methanol, ethanol, n-propyl alcohol, i-propyl alcohol, butyl alcohol, 2-ethylhexyl alcohol, etc. Among these, ethanol is preferably used. These alcohols may be used in admixture of two or more kinds.

The molar ratio of the alcohol/$MgCl_2$ is in the range of 3.0 to 6.0 and those of 5.0 or more are particularly preferred. The solution of a magnesium compound and an alcohol is obtained by heating the mixture in a molar ratio within the above range. As to the heating temperature, if it is a temperature forming a solution state or higher, there is no particular limitation, but 70° C. or higher is preferred.

The solution of a magnesium compound and an alcohol is fed into a spray nozzle fixed to the spray column by a heated pressurized inert gas. The inert gas is preferably nitrogen gas. The solution is dispersed by the nozzle to produce spherical particles. As to the type of the nozzle, a two-fluid nozzle is preferred. By choosing the flow quantity of the inert gas or the nozzle, it is possible to adjust the size or distribution of the resulting carrier particles.

The spraying in the process of the present invention is usually carried out in a cooled spray column, and the cooling is carried out by introducing a cooled inert gas or a cooled inert liquid fluid such as liquid nitrogen, chilled hexane, etc. into the spray column. The cooling is necessary to be carried out at a temperature to an extent to which a substantial vaporization of the alcohol from the carrier particles does not occur, and the temperature inside the spray column is usually 0° C. or lower, preferably −10° C. or lower. Further, at the time of the spraying, it is also possible to promote the spraying by simultaneously spraying a cooled inert hydrocarbon such as hexane through a separate nozzle.

The sprayed carrier is collected at the bottom part of the spray column or in an inert hydrocarbon introduced therein. The inert hydrocarbon is preferably hexane. The resulting carrier has the same composition as that of the solution of an magnesium compound and an alcohol as the raw material, and it is possible to produce a spherical carrier having a particle diameter of about 10 to 300 μm.

As to the process for drying the above carrier used in the present invention, drying by passing of an inert gas at room temperature, passing of a heated inert gas or drying at room temperature or higher under reduced pressure is carried out. Further, the above drying processes may be employed in combination. The inert gas is preferably nitrogen. As to the drying conditions, it is necessary to choose the composition of the carrier after dried so that it may fall within the range of $MgCl_2 \cdot mROH$ wherein R represents an alkyl group of 1 to 10 carbon atoms and m represents 0.4 to 2.0. If m in the carrier composition after dried is larger than 2.0, the carrier particles are broken at the time of the subsequent treatment with a titanium halide and the particles become fine powder of indefinite shapes. Further, if m is less than 0.4, the catalyst activity is notably reduced. Further, as to the drying conditions, drying temperature is preferably low temperature in order to avoid rapid vaporization of the alcohol, and the drying time is necessary to be at least 2 to 3 hours. Under such conditions, preferably the drying time is 5 to 1,000 hours and the drying temperature is room temperature to 90° C.

Concrete examples of the titanium halide used in the present invention are $TiCl_4$, $TiBr_4$, methoxytitanium trichloride, phenoxytitanium trichloride, dimethoxytitanium dichloride, trimethoxytitanium chloride, etc. Among these, $TiCl_4$ is preferred. The above titanium halide may be diluted with an inert solvent. Concrete examples of the inert solvent are aliphatic hydrocarbons such as hexane, heptane, decane, etc., aromatic hydrocarbons such as benzene, toluene, xylene, etc., and halogenated hydrocarbons such as $CCl_4$, 1,2-dichloroethane, 1,1,2-trichloroethane, chlorobenzene, o-dichlorobenzene, etc. Among these, 1,2-dichloroethane is preferred.

Examples of the electron-donating compound simultaneously used at the time of treatment with the titanium halide of the present invention are carboxylic acids, ethers, esters, ketones, aldehydes, acid anhydrides, amines, nitriles, phosphines, etc. Among these, esters are preferred. Concrete examples are methyl benzoate, ethyl benzoate, methyl toluylate, ethyl toluylate, methyl anisate, ethyl anisate, phenyl anisate, dimethyl phthalate, diethyl phthalate, di-n-butyl phthalate, di-i-butyl phthalate, etc. Among these, di-n-butyl phthalate and di-i-butyl phthalate are preferred.

In the reaction of the carrier obtained by spraying according to the process of the present invention, with the titanium halide, the molar ratio of Ti in the titanium halide to $MgCl_2$ in the carrier is 1 to 100, preferably 3 to 50. Further, the molar ratio of the electron-donating compound to $MgCl_2$ in the carrier is 0.01 to 0.8, preferably 0.05 to 0.7. The reaction temperature is −20° C. to +200° C., preferably 50° to 150° C. The reaction time is 5 minutes to 6 hours, preferably 10 minutes to 5 hours. This reaction may be many times repeated under the above reaction conditions, and at that time, the electron-donating compound may be added or may not be added, but it must be added at least once in any one of the reactions.

After the reaction, the resulting solids are separated by filtering-off or decantation, followed by washing with an inert hydrocarbon solvent to remove unreacted substances, byproducts, etc.

Concrete examples of the solvent used at the time of the washing are hexane, heptane, octane, nonane, decane, kerosine, etc. Among these, hexane and heptane are preferred. The thus obtained solid catalyst component may be dried and stored in powder form or may also be suspended in the above inert hydrocarbon solvent and stored.

The solid catalyst component obtained above is combined with an organoaluminum compound and an organosilicon compound to obtain a catalyst for olefin polymerization. Concrete examples of the organoaluminum compound are triethylaluminum, tri-n-propylaluminum, tri-i-butylaluminum, diethylaluminum ethoxide, dimethylaluminum chloride, diethylaluminum chloride, ethylaluminum sesquichloride, ethylaluminum dichloride, etc. Among these, triethylaluminum is preferred.

Concrete examples of the organosilicon compound are methyltrimethoxysilane, t-butyltrimethoxysilane, t-butyltriethoxysilane, phenyltrimethoxysilane, phenyltriethoxysilane, methylethyldimethoxysilane, methylphenyldiethoxysilane, dimethyldimethoxysilane, dimethyldiethoxysilane, diisopropyldimethoxysilane, diisobutyldimethoxysilane, di-t-butyldimethoxysilane, diphenyldimethoxysilane, trimethylmethoxysilane, trimethylethoxysilane, etc. Among these, diphenyldimethoxysilane and di-t-butyldimethoxysilane are preferred.

The quantity of the organoaluminum compound used is 10 to 1,000 mols, preferably 50 to 500 mols per mol of titanium in the solid catalyst component.

The quantity of the organosilicon compound used is 0.01 to 2 mols, preferably 0.05 to 1 mol per mol of the organoaluminum compound.

Examples of the olefin used for polymerization reaction in the present invention are ethylene, propylene, 1-butene, 1-pentene, 1-hexene, 1-octene, 1-decene, 1-dodecene, 1-tetradecene, 1-hexadecene, 1-octadecene, 1-eicocene, 4-methyl-1-pentene, 3-methyl-1-pentene, etc. The polymerization of these olefins includes not only homopolymerization, but also copolymerization thereof with one or more kinds of other olefins. Further, the above catalyst of the present invention is also effective for copolymerizing the above olefins with butadiene, 1,4-hexadiene, 1,4-pentadiene, 1,7-octadiene, 1,8-nonadiene, 1,9-decadiene, isoprene, styrene, cyclopropene, cyclobutene, cyclohexene, norbornene, dicyclopentadiene, etc.

The polymerization may be carried out in liquid phase or gas phase. In the case of the polymerization in liquid phase, an inert hydrocarbon solvent such as hexane, heptane, octane, nonane, decane, kerosine, etc. may be used as a polymerization medium, and liquefied olefins such as liquefied propylene, liquefied butene-1, etc., themselves, may also be used as a solvent.

The polymerization temperature is 40° to 200° C., preferably 50° to 150° C. The polymerization pressure is the atmospheric pressure to 100 Kg/cm²G, preferably 5 to 50 Kg/cm²G. The polymerization may be carried out batchwise, semicontinuously or continuously, but among these, continuous polymerization is commercially preferred. Further, the polymerization may also be carried out by multi-stage polymerization wherein polymerization conditions at the respective stages are different. In order to adjust the molecular weight of polymer, it is effective to add a molecular weight-modifying agent such as hydrogen to the polymerization system.

According to the process of the present invention, a spherical solid catalyst component having a large particle diameter is obtained without breakage of the shape of particles formed at the time of spraying even when the particles are treated with a titanium halide. Further, when the catalyst using the catalyst component is used for olefin polymerization, a polyolefin having a superior particle diameter and particle size distribution is obtained. (Example)

The present invention will be described in more detail by way of Examples, but it should not be construed to be limited thereto.

EXAMPLE 1

(a) Preparation of Solid Catalyst Component

Anhydrous MgCl$_2$ (95.3 g) and dried ethanol (352 ml) were fed into a SUS autoclave purged with nitrogen gas, followed by heating the mixture to 105° C. with stirring, and after agitation for one hour, feeding the solution into a two-fluid spray nozzle by pressurized nitrogen gas (10 Kg/cm²G) heated to 105° C., the flow quantity of the nitrogen gas being 38 l/min. and liquid nitrogen for cooling being introduced into a spray column to keep the temperature inside the column at −15° C. The product was collected in cooled hexane introduced into the bottom part inside the column to obtain 256 g of the product. From the analytical result of the product, the composition of this carrier was MgCl$_2$.6EtOH same as that of the starting solution.

In advance of drying the carrier, it was sieved to obtain a spherical carrier having a particle diameter of 45 to 212 μm (205 g), followed by drying 15 g of the carrier while passing nitrogen gas in a flow quantity of 3 l/min. for 161 hours. From its analytical result, the composition of this carrier was MgCl$_2$.1.7EtOH.

The dried carrier (5 g), TiCl$_4$ (40 ml) and purified 1,2-dichloroethane (60 ml) were mixed in a glass flask, followed by heating the mixture to 100° C. with stirring, adding diisobutyl phthalate (1.7 ml), heating the mixture at 100° C. for 2 hours, removing the liquid phase portion by decantation, again adding TiCl$_4$ (40 ml) and purified 1,2-dichloroethane (60 ml), heating the mixture at 100° C. for one hour, removing the liquid phase portion by decantation, washing with purified hexane and drying to obtain a solid catalyst component.

(b) Production of Olefin Polymer

Hexane (1.5 l), triethylaluminum (3 mmol), diphenyldimethoxysilane (0.45 mmol) and the solid catalyst component (20 mg) were fed into a 3 l capacity SUS autoclave purged with nitrogen gas, followed by continuously introducing propylene so as to give a total pressure of 1 Kg/cm²G at room temperature to polymerize it for 10 minutes, raising the temperature up to 70° C., introducing hydrogen (150 ml), continuously introducing propylene at 70° C. so as to give a total pressure of 7 Kg/cm²G to polymerize propylene for 2 hours, discharging unreacted propylene, filtering, and drying the resulting polypropylene to obtain 180 g of polypropylene (its catalyst activity: 9,000 g.PP/g.Cat.). Hexane-soluble portion was 0.9% by weight of the total quantity of the resulting polypropylene, and its bulk density was 0.35 g/ml. The resulting polypropylene was spherical and had an average particle diameter of 2,040 μm.

EXAMPLE 2

(a) Preparation of Solid Catalyst Component

Example 1 was repeated except that the drying time of the carrier was varied to 263 hours. In addition, the composition of the carrier after dried was MgCl$_2$.0.8EtOH.

(b) Production of Olefin Polymer

Propylene polymerization was carried out in the same manner as in Example 1, but using the above solid catalyst component. Polypropylene (150 g) was obtained and the catalyst activity was 7,500 g.PP/g.Cat. Hexane-soluble portion was 1.4% by weight of the total quantity of the resulting polypropylene, and its bulk density was 0.33 g/ml. The resulting polymer was spherical and had an average particle diameter of 1,910 μm.

EXAMPLE 3

(a) Preparation of Solid Catalyst Component

Anhydrous $MgCl_2$ (95.3 g) and dried ethanol (235 ml) were fed into a SUS autoclave purged with nitrogen gas, followed by heating the mixture to 130° C. with stirring for dissolution, feeding the solution after agitated for one hour into a two-fluid spray nozzle by pressurized nitrogen gas (10 Kg/cm$^2$G) heated to 130° C., the flow quantity of the nitrogen gas being 38 l/min., and liquid nitrogen for cooling being introduced into a spray column to keep the temperature inside the column at $-15°$ C. The resulting product was collected into cooled hexane introduced into the bottom part of the column to obtain 175 g of the product. From the analytical result of the product, its composition was $MgCl_2.4EtOH$ same as that of the starting solution.

In advancing of drying the carrier, it was sieved to obtain a spherical carrier having a particle diameter of 45 to 212 μm (131 g). A portion of the carrier (15 g) was dried passing nitrogen gas in a flow quantity of 3 l/min. at room temperature for 187 hours. From the analytical result of the resulting carrier, its composition was $MgCl_2.1.0EtOH$.

The dried carrier (5 g), $TiCl_4$ (40 ml) and purified 1,2-dichloroethane (60 ml) were mixed in a glass flask, followed by heating the mixture to 100° C. with stirring, adding diisobutyl phthalate (1.7 ml), heating the mixture at 100° C. for 2 hours, removing the liquid phase portion by decantation, again adding $TiCl_4$ (40 ml) and purified 1,2-dichloroethane (60 ml), heating the mixture at 100° C. for one hour, removing the liquid phase portion by decantation, washing with purified hexane and drying to obtain a solid catalyst component.

(b) Production of Olefin Polymer

Hexane (1.5 l), triethylaluminum (3 mmol), diphenyldimethoxysilane (0.45 mmol) and the above solid catalyst component (25 mg) were introduced into a 3 l capacity SUS autoclave purged with nitrogen gas, followed by continuously feeding propylene so as to give a total pressure of 1 Kg/cm$^2$G at room temperature to polymerize it for 10 minutes, thereafter raising the temperature up to 70° C., feeding hydrogen (150 ml), continuously feeding propylene so as to give a total pressure of 7 Kg/cm$^2$G at 70° C. to polymerize it for 2 hours, discharging unreacted propylene, filtering and drying the resulting polypropylene to obtain 150 g of polypropylene. The catalyst activity was 6,000 g.PP/g.Cat. Hexane-soluble portion was 1.9% by weight of the total quantity of the resulting polypropylene and its bulk density was 0.30 g/ml. The resulting polymer was spherical and had an average particle diameter of 1,900 μm.

EXAMPLE 4

(a) Preparation of Solid Catalyst Component

Example 1 was repeated except that the drying conditions of the carrier were changed to those of room temperature for 41 hours in a flow quantity of nitrogen gas of 3 l/min. and further 80° C. for 17 hours. In addition, the composition of the carrier after dried was $MgCl_2.1.1EtOH$.

(b) Production of Olefin Polymer

Propylene polymerization was carried out in the same manner as in Example 1, but using the above solid catalyst component. Polypropylene of 160 g was obtained and the catalyst activity was 8,000 g.PP/g.Cat. Hexane-soluble portion was 1.2% by weight of the total quantity of the resulting polypropylene. Further, the bulk density was 0.32 g/ml. The resulting polymer was spherical and had an average particle diameter of 2,000 μm.

EXAMPLE 5

(a) Preparation of Solid Catalyst Component

Example 1 was repeated except that the drying conditions were changed to those of 40° C. under reduced pressure for 16 hours and further 60° C. for 3 hours. In addition, the composition of the carrier after dried was $MgCl_2.0.9EtOH$.

(b) Production of Olefin Polymer

Propylene polymerization was carried out in the same manner as in Example 1, but using the above solid catalyst component. Polypropylene of 164 g was obtained and the catalyst acitivity was 8,200 g.PP/g.Cat. Hexane-soluble portion was 0.9% by weight of the total quantity of the resulting polypropylene, and the bulk density was 0.31 g/ml. The resulting polymer was spherical and had an average particle diameter of 2,060 μm.

COMPARATIVE EXAMPLE 1

(a) Preparation of Solid Catalyst Component

Example 3 was repeated except that the drying time of the carrier was changed to 527 hours. In addition, the composition of the carrier after dried was $MgCl_2.0.1EtOH$.

(b) Production of Olefin Polymer

Propylene polymerization was carried out in the same manner as in Example 3, but using the above solid catalyst component. Polypropylene of 7 g was obtained, and the catalyst activity was 280 g.PP/g.Cat. Hexane-soluble portion was 17.5% by weight of the total quantity of the resulting polypropylene. The resulting polymer was spherical and had an average particle diameter of 740 μm.

COMPARATIVE EXAMPLE 2

(a) Preparation of Solid Catalyst Component

Example 3 was repeated except that the drying time was changed to 31 hours. In addition, the composition of the carrier after dried was $MgCl_2.2.9EtOH$.

When this carrier was subjected to treatment with a titanium halide, the carrier was broken into small particles having indefinite shapes.

(b) Production of Olefin Polymer

Propylene polymerization was carried out in the same manner as in Example 3, but using the above solid catalyst component. Polypropylene of 117 g was obtained, and the catalyst activity was 4,700 g.PP/g.Cat. Hexane-soluble portion was 4.7% by weight of the total quantity of the resulting polypropylene, and the bulk density was 0.25 g/ml. The resulting polymer had indefinite shapes and an average particle diameter of 900 μm.

COMPARATIVE EXAMPLE 3

(a) Preparation of Solid Catalyst Component

Anhydrous $MgCl_2$ (95.3 g) and dried ethanol (176 ml) were fed into a SUS autoclave purged with nitrogen gas, followed by heating the mixture to 146° C. with stirring for dissolution, feeding the resulting solution after agitated for one hour into a two-fluid spray nozzle by pressurized nitrogen gas (10 $Kg/cm^G$) heated to 146° C. in a flow quantity of nitrogen gas of 38 l/min., liquid nitrogen for cooling being introduced into a spray column and the temperature inside the column being kept at −15° C. The product was collected in cooled hexane introduced into the bottom part of the column to obtain 134 g of the product. From the analytical result of the product, the composition of this carrier was $MgCl_2.3EtOH$ same as that of the starting solution.

By sieving the product, a carrier (94 g) having a particle diameter of 45 to 212 μm and indefinite shapes was obtained. This carrier was used for the subsequent treatment with a titanium halide, without drying.

The above sieved carrier (5 g) and purified 1,2-dichloroethane (60 ml) were mixed in a glass flask, followed by dropwise adding $TiCl_4$ (40 ml) with stirring at 0° C., further adding diisobuty phthalate (1.7 ml) at 0° C., raising the temperature up to 100° C., heating for one hour, removing the liquid phase portion by decantation, again adding $TiCl_4$ (40 ml) and purified 1,2-dichloroethane (60 ml), heating the mixture at 100° C. for one hour, removing the liquid phase portion by decantation, washing with purified hexane and drying to obtain a solid catalyst component. The catalyst particles were broken into fine particles having indefinite shapes.

(b) Production of Olefin Polymer

Propylene polymerization was carried out in the same manner as in Example 1, but using the above solid catalyst. Polypropylene of 90 g was obtained and the catalyst activity was 4,500 g.PP/g.Cat. Hexane-soluble portion was 6.6% by weight of the total quantity of the resulting polypropylene, and the bulk density was 0.18 g/mol. The resulting polymer had indefinite shapes and an average particle diameter of 930 μm.

COMPARATIVE EXAMPLE 4

(a) Preparation of Solid Catalyst Component

Anhydrous $MgCl_2$ (95.3 g) and water (108 ml) were fed into a SUS autoclave purged with nitrogen gas, followed by heating the mixture to 110° C. with stirring for dissolution, feeding the solution after agitated for one hour into a two-fluid spray nozzle by pressurized nitrogen gas (10 $Kg/cm^2G$) heated to 110° C., in a flow quantity of nitrogen gas of 13 l/min. The temperature inside the spray column was kept at room temperature. The product was collected into the bottom part inside the column to obtain 142 g of the product. From the analytical result of the product, the composition of this carrier was $MgCl_2.6H_2O$ same as that of the starting solution.

In advance of drying the carrier, the carrier was sieved to obtain a spherical carrier (105 g) having a particle diameter of 45 to 212 μm. A portion (15 g) of the resulting carrier was dried passing nitrogen gas at 3 l/min., at 130° C. for 3 hours, followed by drying under reduced pressure at 130° C. for 6 hours. From the analytical result, the composition of the resulting carrier was $MgCl_2.0.7H_2O$.

The above dried carrier (5 g), $TiCl_4$ (40 ml) and purified 1,2-dichloroethane (60 ml) were mixed in a glass flask, followed by heating the mixture to 100° C. with stirring, adding diisobutyl phthalate (1.7 ml), heating the mixture at 100° C. for 2 hours, removing the liquid phase portion by decantation, again adding $TiCl_4$ (40 ml) and purified 1,2-dichloroethane (60 ml), heating the mixture at 100° C. for one hour, removing the liquid phase portion by decantation, washing with purified hexane and drying to obtain a solid catalyst component.

(b) Production of Olefin Polymer

Propylene polymerization was carried out in the same manner as in Example 1. Polypropylene of 1 g was obtained and the catalyst activity was 50 g.PP/g.Cat.

What we claim is:

1. A process for producing a catalyst component for olefin polymerization which comprises the steps of
    (a) forming a solution of a magnesium compound and 3 to 6 moles of an alcohol having the formula ROH wherein R is an alkyl group of 1 to 10 carbon atoms,
    (b) spraying said solution in the form of droplets into a spray column, the temperature in said spray column being cool enough to cause the formation of solid spherical particles therein having a magnesium compound to alcohol molar ratio that is substantially the same as the solution in step (a),
    (c) collecting the solid spherical particles produced in said spray column,
    (d) subjecting said collected solid spherical particles to drying conditions to remove alcohol so as to reduce the molar ratio of the alcohol to the magnesium compound to 0.4:1 to 2:1, and
    (e) treating the dried solid spherical product resulting from step (d) with a titanium halide and an electron-donating compound.

2. A process according to claim 1 wherein the magnesium compound is magnesium chloride.

3. A process according to claim 1 wherein the drying time of step (d) is 5 to 1,000 hours.

4. A process according to claim 1 wherein the alcohol is ethanol.

5. A process according to claim 2 wherein the alcohol is ethanol.

* * * * *